J. B. DUANE.
Gang-Plow.

No. 22,494.

Patented Jan. 4, 1859.

WITNESSES:

INVENTOR:

John B. Duane

UNITED STATES PATENT OFFICE.

JOHN B. DUANE, OF SCHENECTADY, NEW YORK.

IMPROVEMENT IN CULTIVATORS.

Specification forming part of Letters Patent No. 22,494, dated January 4, 1859.

*To all whom it may concern:*

Be it known that I, J. B. DUANE, of Schenectady, in the county of Schenectady and State of New York, have invented a new and Improved Gang-Plow; and I do hereby declare that the following is a full, clear, and exact description of the same, reference being had to the annexed drawings, making a part of this specification, in which—

Figure 1:
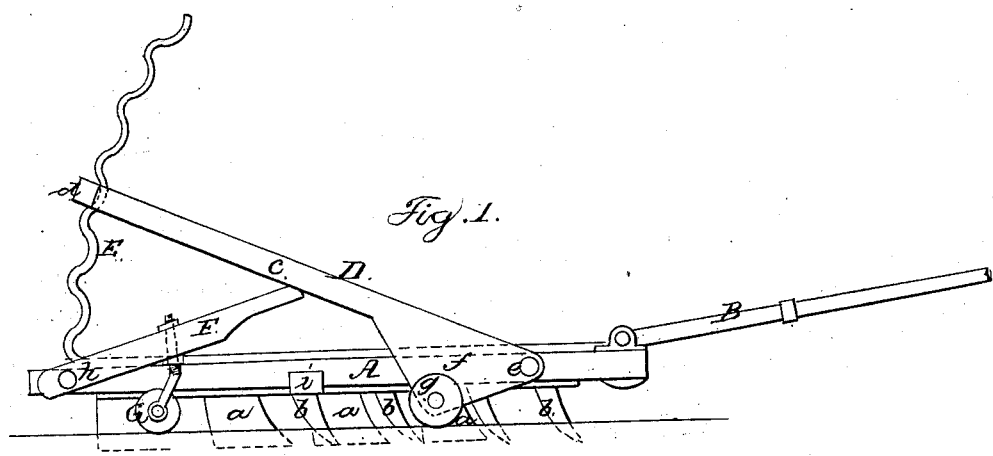
Figure 2:
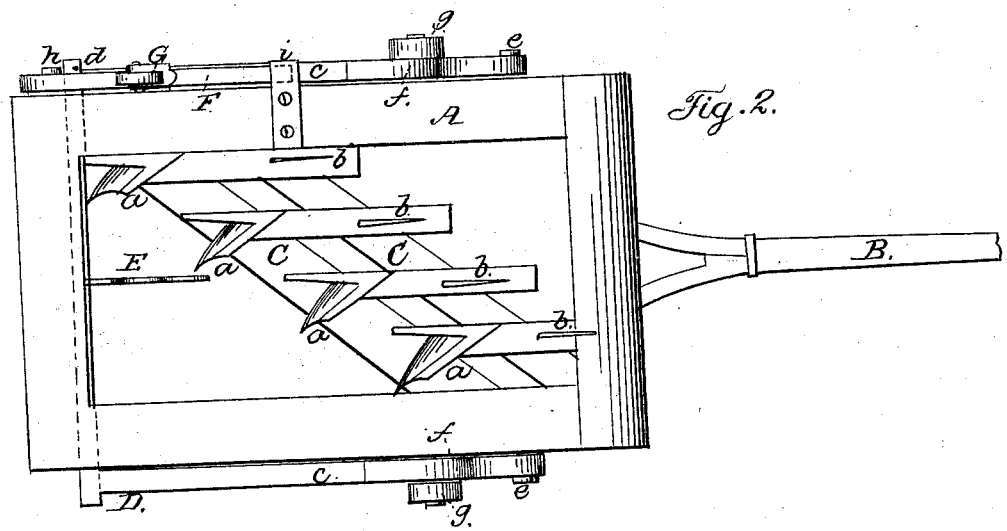

Figure 1 is a side view of my invention. Fig. 2 is an inverted plan of the same.

Similar letters of reference indicate corresponding parts in the two figures.

To enable those skilled in the art to fully understand and construct my invention, I will proceed to describe it.

A represents a rectangular frame, to the front end of which a draft-pole, B, is attached.

C C are two parallel bars, which are secured obliquely or diagonally in the frame A, as shown in Fig. 2. To the under side of the bars C C a series of plows, a, are attached. These plows may be of the usual single mold-board form, and each plow may be provided with a colter, b. The plows are attached to the bars C one a little in advance of the other, as shown clearly in Fig. 2, and any proper number may be used, according to the size of the machine.

D is a frame which is formed of two parallel bars, c c, connected at their outer ends by a traverse-bar, d. The front ends of the bars c c are connected by bolts or pins e to opposite sides of the frame A, and near its front end, the bars c c being sufficiently long to allow the bar d to be near the back end of the frame A. The front ends of the bars c c are allowed to work freely on the bolts or pins e, and the front parts of said bars have V-shaped projections, f, formed on or attached to them, one to each. The form of these projections is shown clearly in Fig. 1. To the end of each projection f a wheel, g, is attached. These wheels, it will be seen by referring to Fig. 1, occupy positions below the plane of the bars c c and bolts or pins e.

To the back part of the frame A a curved or segment rack-bar, E, is attached. This bar may be formed of a metal rod crimped or bent, so as to form a series of notches to receive the traverse-bar d of the frame D, and retain said frame at any desired angle of inclination within the scope of its intended adjustment, the bar E being allowed to have a certain degree of flexibility, so that the traverse-bar c may be relieved from it, in order to permit of the adjustment of the same.

To the right-hand side of the frame A, and adjoining one end of the bars C C, a bar, F, is attached by a bolt or pin, h, the bar F being allowed to work freely on said bolt or pin. To about the center of the bar F a caster-wheel, G, is secured, and to the frame A, in line with the front part of the bar F, a bearing, i, for said bar F is attached.

The operation is as follows: As the implement is drawn along the plows a form a series of furrows, one turning the earth in advance of the other, the driver walking behind the machine, within reach of the traverse-bar d of the frame D. In case the shares a require to be raised in order to pass over an obstruction, the driver depresses the bar d, or the back part of frame D, and as the wheels g rest or bear on the surface of the ground below the plane of the bars c c and bolts e and back of the bolts e, the frame A and its plows a will be raised bodily, in an inclined direction, backward, and as the caster-wheel G also rests on the ground, the end of bar F will bear against the under side of one of the bars c of the frame D, and consequently said wheel G will form a support for the back part of the frame A, and also serve as a bearing or fulcrum, as well as the wheels g, while the frame is being raised. This upward and backward movement of the frame A and plows a readily admits of the plows being freed from obstructions in case the points of the shares of the plows, before being raised, should pass underneath said obstructions. The shares may also be retained at any desired height, so that the furrows may be of a greater or less depth, by securing the traverse-bar d in the proper notch of bar E.

Having described my invention, I claim and desire to secure by Letters Patent—

The arrangement and combination of the frame D, having wheels g, bar F, wheel G, bar E, and frame A, as and for the purpose herein shown and described.

JOHN B. DUANE.

Witnesses:
WM. TUSCHL,
W. HAUFF.